(12) United States Patent
Kakei (10) Patent No.: US 7,740,406 B2
(45) Date of Patent: Jun. 22, 2010

(54) LINEAR MOTION GUIDE SYSTEM WITH HIGHLY-TIGHT SEALING UNITS

(75) Inventor: Shigeki Kakei, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 476 days.

(21) Appl. No.: 11/783,664

(22) Filed: Apr. 11, 2007

(65) Prior Publication Data

US 2007/0242906 A1 Oct. 18, 2007

(30) Foreign Application Priority Data

Apr. 18, 2006 (JP) .............................. 2006-114742

(51) Int. Cl.
*F16C 29/06* (2006.01)
*F16C 33/66* (2006.01)

(52) U.S. Cl. .............................. 384/15; 384/13; 384/45

(58) Field of Classification Search ............. 384/13–16, 384/43–45, 49, 51
See application file for complete search history.

(56) References Cited

U.S. PATENT DOCUMENTS

| | | | | |
|---|---|---|---|---|
| 5,492,413 A | * | 2/1996 | Tsukada ....................... | 384/15 |
| 5,634,722 A | * | 6/1997 | Yuasa et al. ................... | 384/15 |
| 5,769,543 A | * | 6/1998 | Tsukada et al. ............... | 384/15 |
| 5,772,333 A | * | 6/1998 | Yabe et al. ..................... | 384/45 |
| 6,082,899 A | * | 7/2000 | Suzuki et al. ................. | 384/13 |
| 6,155,717 A | * | 12/2000 | Michioka et al. ............. | 384/15 |
| 6,257,766 B1 | * | 7/2001 | Agari .......................... | 384/45 |
| 6,705,430 B2 | * | 3/2004 | Michioka et al. .............. | 184/5 |
| 2002/0027044 A1 | | 3/2002 | Michioka et al. | |

FOREIGN PATENT DOCUMENTS

| | | |
|---|---|---|
| JP | 9-42284 | 2/1997 |
| JP | 11-351252 | 12/1999 |
| JP | 2000-227115 | 8/2000 |
| JP | 2005-337407 | 12/2005 |

* cited by examiner

*Primary Examiner*—Marcus Charles
(74) *Attorney, Agent, or Firm*—Browdy and Neimark, PLLC (57) ABSTRACT

A linear motion guide system is disclosed in which a clearance between a slider and a guide rail is closed truly to clear foreign matter away from entering inside the system through any end of the slider traveling on the guide rail. Thus, the linear motion guide system is befitting to severe working environment where much foreign matter occurs. A highly-tight sealing unit is comprised of a cassette constituted with a front panel and an enclosure, sealing plates stowed into the cassette, lubrication plates each interposed between any two adjacent sealing plates, and a rear panel to close an open edge of the enclosure. The sealing plates are each composed of an intermediate spongy medium flanked by skin layers and impregnated with lubricant. The lubrication plates have pores filled with lubricant.

3 Claims, 8 Drawing Sheets

LINEAR MOTION GUIDE SYSTEM WITH HIGHLY-TIGHT SEALING UNITS

FIELD OF THE INVENTION

The present invention relates to a linear motion guide system befitting to severe working environment where much foreign matter including chips, debris, dirt, dusts, and so on occurs or any liquid including processing fluids, coolants, and so on splashes. More particularly, it relates to a linear motion guide system with highly-tight sealing units that are effective to prevent the foreign matter from invading through forward and aft end caps of a slider that moves on a guide rail.

BACKGROUND OF THE INVENTION

The linear motion guide systems incorporated in a diversity of machines including machine tools and so on are increasingly used in recent years in a way laying their guide rails bare to the working atmosphere from the view point of increasing ample spaces to be reserved for workplace during manufacturing process and for installation of required equipments, making the guide systems themselves compact or slim in construction, cost savings on installations, and so on. Thus, many of modern linear motion guide systems are customized to have no dustproof means including a telescopic cover, bellows, and so on.

There are known linear motion guide systems with sealing means, which are disclosed in, for example the commonly assigned Japanese Patent Laid-Open No. H09-042284. With the prior linear motion guide system, the sealing means are mounted on forward and aft ends of a slider. The sealing means are each comprised of a cassette of roughly U-shape in transverse section, two sheets of seals installed inside the cassette, an intermediate medium held between the seals to supply lubricant, and a scraper plate secured on the outward end of the outside one of the seals. Two sheets of seals are each made substantially U-shaped in transverse section and composed of a metal core and rubber baked on the metal core to provide lips. The interference of the seals with the guide rail is selected at 0.5 mm, which is somewhat larger than usual to make the dust proof performance better.

Nevertheless, the sealing means for the linear motion guide system constructed as stated earlier, because of rubber-made construction, may encounter large frictional resistance and, therefore, lubricant is indispensable to sustain durability of the sealing performance. Thus, the problem faced in the linear motion guide system recited earlier is that the control of lubricant is very tough.

A linear bearing guide system capable of wiping dusts off to keep sealing performance is known in, for example Japanese Patent Laid-Open No. H11-351252. This prior linear bearing guide system has a self-lubricating guide member, which is composed of a lip seal of usual rubber and foamed urethane rubber component secured on the outward surface of a reinforcing plate and impregnated with lubricant. The guide member is protected against lubrication failure to help maintain the durability against frictional resistance. The linear bearing guide system constructed as stated earlier, although but befitting to continuous application of lubricant to the lip seal, has a question of lacking in sealing performance.

A dustproof construction in the linear motion guide systems is known in, for example Japanese Patent Laid-Open No. 2000-227115, which is constructed to allow a slider moving smoothly in and out along a guide track with less frictional resistance. The prior dustproof construction is comprised of a lubricant reservoir component and a scraper component. The lubricant reservoir component includes three sheets of resilient members made of polyurethane foam having open cells or pores and impregnated with lubricant, and spacer members of metallic plates each interposed between any two adjacent resilient members to form recesses. The scraper component is mounted on the slider in a way spaced away from the guide track with leaving a slight clearance between them. The polyurethane form with open pores is prepared to have physical properties of tensile strength of about 30~50 kg/cm$^3$, percent elongation of about 300~500% and repulsion elasticity of about 30~60%. The polyurethane foam is impregnated with lubricant of 30~50% by weight. With the dustproof construction as recited just earlier, nevertheless, the foamed resilient members comes to absorb coolants and so on, so that foreign matter such as any liquids builds up gradually in the resilient members. Thus, this poses a problem that the resilient members are insufficient to dislodge the foreign matter or contaminants from the linear motion guide system.

Another linear guide bearing unit is disclosed in, for example Japanese Patent Laid-Open No. 2005-337407, which is constructed to keep foreign matter or contaminants against entering inside the slider to prevent premature wear and breakage. The prior linear guide bearing unit is mounted on forward and aft ends of the slider and composed of the combination of many lubricant applicators, protectors, thin resinous sealing members, side seals of steel plate baked with rubber, and felt sealing members containing grease therein. With the linear guide bearing unit having a plurality of sealing members stacked one on the other as stated earlier, however, large axial space would be needed for installation of many sealing members.

SUMMARY OF THE INVENTION

The present invention, therefore, has as its principal object to overcome the problems stated earlier and, in particular, to provide a linear motion guide system with highly-tight sealing units constructed to fit easier over forward and aft ends of slider that fits over or conforms to a guide rail in a sliding manner. More in detail, the highly-tight sealing unit is mainly composed of a sealing plate made of a sheet material of mechanical froth urethane foam, which has been ordinarily used in packings and shock absorbers. The sheet material of mechanical froth urethane foam is cut into a sealing plate of desired shape of three-layered structure, a suitable number of which is stowed inside a cassette together with lubrication plates in a close juxtaposition that the lubrication plates are each interposed between any two adjoining sealing plates to feed positively the lubricant on the raceway grooves of the guide rail, making sure of smooth sliding movement of the slider along the guide rail.

The present invention is concerned with a linear motion guide system, comprising a guide rail made with a lengthwise raceway groove, a slider moving on the guide rail in a sliding manner by virtue of more than one roller, and a highly-tight sealing unit mounted on any one of forward and aft ends of the slider to come into close sliding-contact with lengthwise outward surfaces around the guide rail, making sure of highly sealing effect to keep any foreign matter away from entering inside the slider;

wherein the highly-tight sealing unit includes therein a sealing plate serving the sealing effect and a lubrication plate for feeding at least the sealing plate with lubricant; and wherein the sealing plate has a three-layered structure composed of skin layers of rubbery texture to constitute epidermal layers and an intermediate medium of spongy texture lying between the epidermal layers.

In one aspect of the present invention, a linear motion guide system is provided in which the sealing plate is composed of mechanical froth urethane foam of low foam ratio, which is formed by frothing mechanically a raw liquid mixed with air.

In another aspect of the present invention, a linear motion guide system is provided in which the highly-tight sealing unit is comprised of a cassette constituted with a front-panel and an enclosure integral with the front panel at any one of edges thereof, the sealing plate stowed into the cassette, the lubrication plate lying in close adjacency of the sealing plate, and a rear panel to close an open edge of the enclosure.

In another aspect of the present invention, a linear motion guide system is provided in which the cassette has a locating pin planted on the front panel thereof while the sealing plate and the lubrication plate are each made with a locating hole to fit over the locating pin on the front panel.

In a further another aspect of the present invention, a linear motion guide system is provided in which the lubrication plate has a sliding-contact edge that is allowed to come into a race made on the guide rail, applying lubricant to the race on the guide rail. As an alternative, the lubrication plate is installed in a geometry not having to touch the race on the guide rail. The lubrication plate, when stowed inside the cassette, is subjected to deflection or deformation to apply lubricant to the race.

In another aspect of the present invention, a linear motion guide system is provided in which the lubrication plate is made of any one selected from felts, thermally bonded fibers, sintered resins, and open-celled foam products, which are impregnated with lubricant.

In another aspect of the present invention, a linear motion guide system is provided in which the slider is comprised of a carriage made thereon with a raceway groove to allow more than one roller to run through there, an end cap secured to any one of forward and aft ends of the carriage and provided therein with a turnaround passage to get the roller turning round in rolling direction, a lubricating plate secured on an outward surface of the end cap to apply lubricant around the roller, and an end seal attached on an outward end of the lubricating plate, and wherein the highly-tight sealing unit is further mounted on an outward surface of the end seal through a spacer.

With the linear motion guide system constructed as stated earlier, the highly-tight sealing unit mounted on the slider closes truly any clearance remaining between the slider and the guide rail to keep any foreign contaminant against invading inside the slider through the forward and aft ends of the slider moving on the guide rail, clearing the foreign contaminant away from the guide rail. Thus, the highly-tight sealing unit is effective to make the linear motion guide system befitting to severe working environment where much foreign matter or contaminants including dust, chips, cutting debris, splashed fluids of cutting fluids, coolants, and so on occurs to adhere to the guide rail.

The lubrication plates each interposed between any two adjacent sealing plates are stowed inside the cassette in a fashion that their sliding-contact edges are either kept in contact with or kept away from the race of the guide rail, keeping constantly proper lubrication to not only the race but also the associated sealing plates, thereby making certain of smooth sliding movement of the sealing plates relatively to the guide rail. The highly-tight sealing unit can work without interfering with a smooth travel of the slider along the guide rail.

Moreover, the sealing plate installed in the highly-tight sealing unit is composed of an intermediate spongy medium flanked by skin layers of close-grained texture and fully impregnated with lubricant independently of other sealing plates. Sufficient lubricant held in the spongy medium prevents any processing liquids or coolants adhered on the guide rail from being absorbed into the spongy medium while the sealing plate travels on the guide rail with keeping sliding-contact with the associated race. The sealing plate wipes the adhered foreign matter including dust, chips debris, and so on off the guide rail while sliding on the guide rail. The sealing plates, as self-lubricated automatically and further fed with an adequate amount of lubricant from the lubrication plates, can slide with continuous smooth relatively to the guide rail.

BRIEF DESCRIPTION OF THE DRAWINGS

FIG. 7 is views explanatory of the sealing plate of FIG. 6, in which FIG. 7(A) is a view in side elevation of the sealing plate and FIG. 7(B) is a fragmentary enlarged view of a portion encircled by (C) in FIG. 7(A);

DETAILED DESCRIPTION OF THE PREFERRED EMBODIMENTS

The linear motion guide system of the present invention features highly-tight sealing units installed on forward and aft ends of a slider to render the linear motion guide system befitting to machine tools including cutting machines, grinding machines, woodcutting machines, and so on, which may cause much foreign matter or contaminant including dust, chips, cutting debris, splashed fluids of cutting fluids, coolants, and so on.

The linear motion guide system with the highly-tight sealing units is made better to keep the foreign matter or contaminant from invading through the forward and aft ends of the slider moving over the guide rail even in the worse working atmosphere where a diversity of machines including machine tools, such as cutting machines, grinding machines and woodcutting machines operates with spewing out much foreign matter or contaminant including dust, chips, cutting debris, splashed fluids of cutting fluids, coolants, and so on.

The present invention is motivated to improve the highly-tight sealing units disclosed in the commonly-assigned senior Japanese Patent application No. 2006-78719 so as to function better in even worse working environment. To this end, the highly-tight sealing unit constructed according to the present invention has lubrication plates each of which is placed between any two adjoining sealing plates to feed lubricant to races. Although the present invention will be described later in its preferred version the slider fits over or conforms to the guide rail in a sliding manner, it will be understood that the present invention can be carried out in another modification in which hollow cylindrical slider fits over a circular guide shaft in a lengthwise sliding manner. The linear motion guide system of the present invention is more versatile in far tougher working environment compared with the linear motion guide systems with the highly-tight sealing means as having stated in the commonly assigned senior application.

Figure 1:
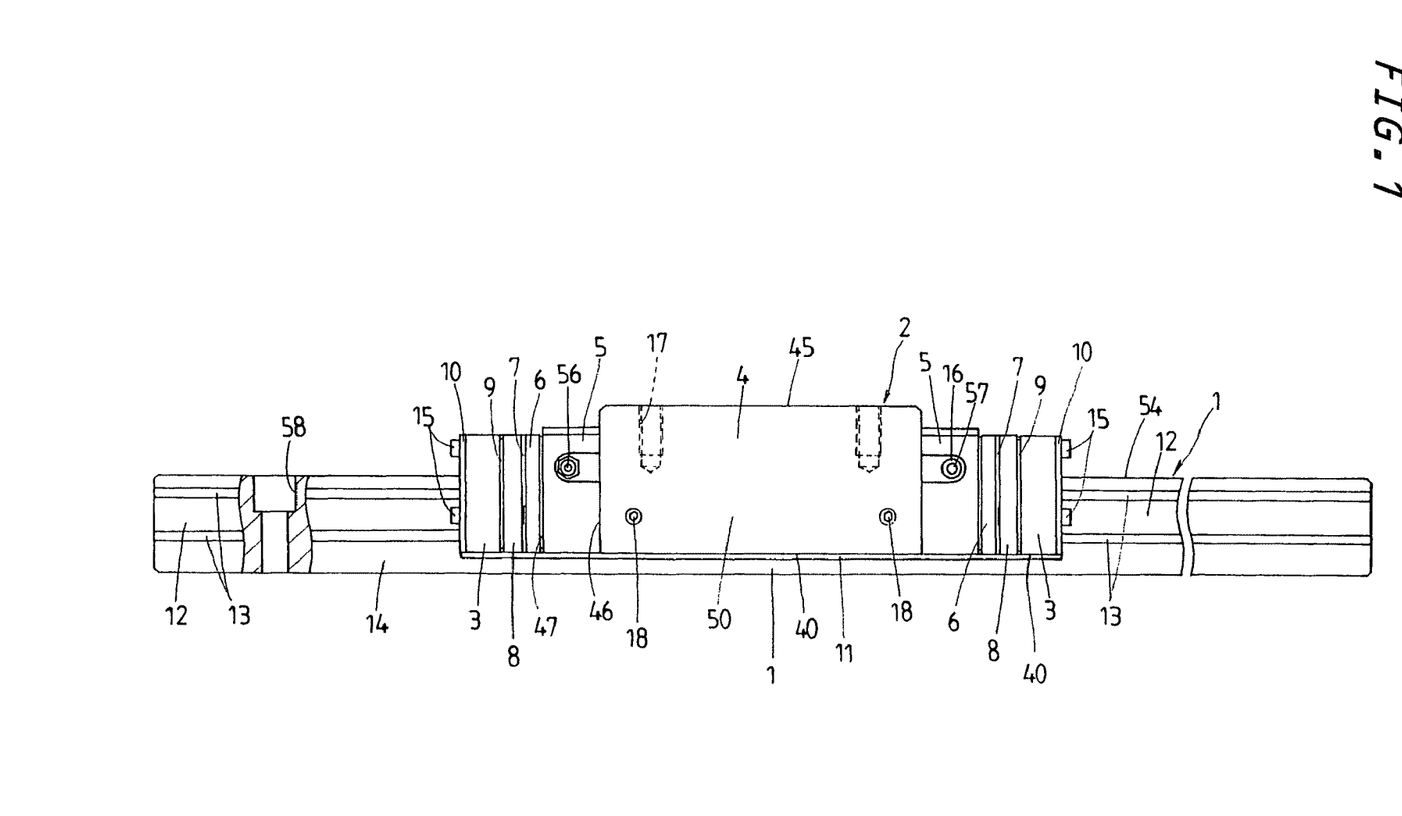
FIG. 1 is a partially cutaway view in front elevation of a preferred embodiment of a linear motion guide system with highly-tight sealing units according to the present invention.
Figure 2:
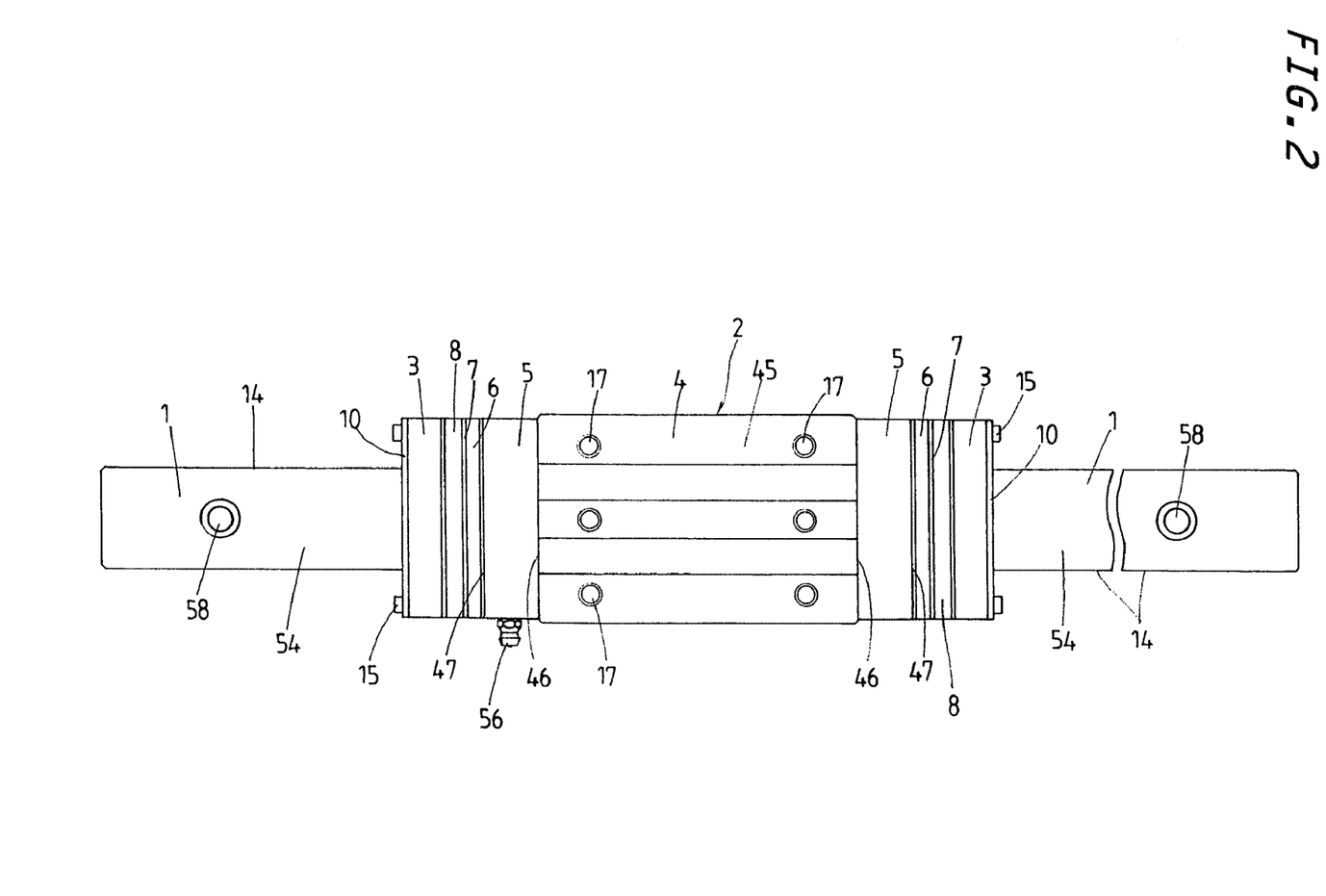
FIG. 2 is a view in plan of the linear motion guide system of FIG. 1.
Figure 3:
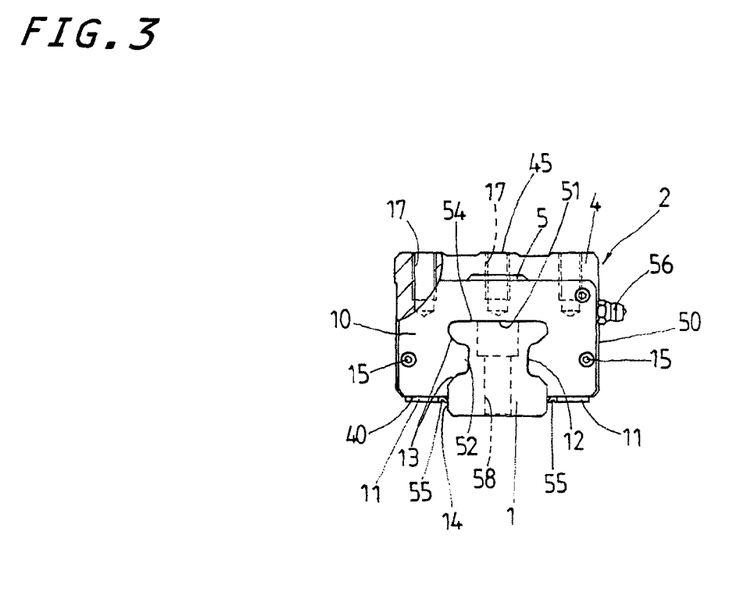
FIG. 3 is a partially cutaway view in side elevation of the linear motion guide system of FIG. 1.
Figure 5:
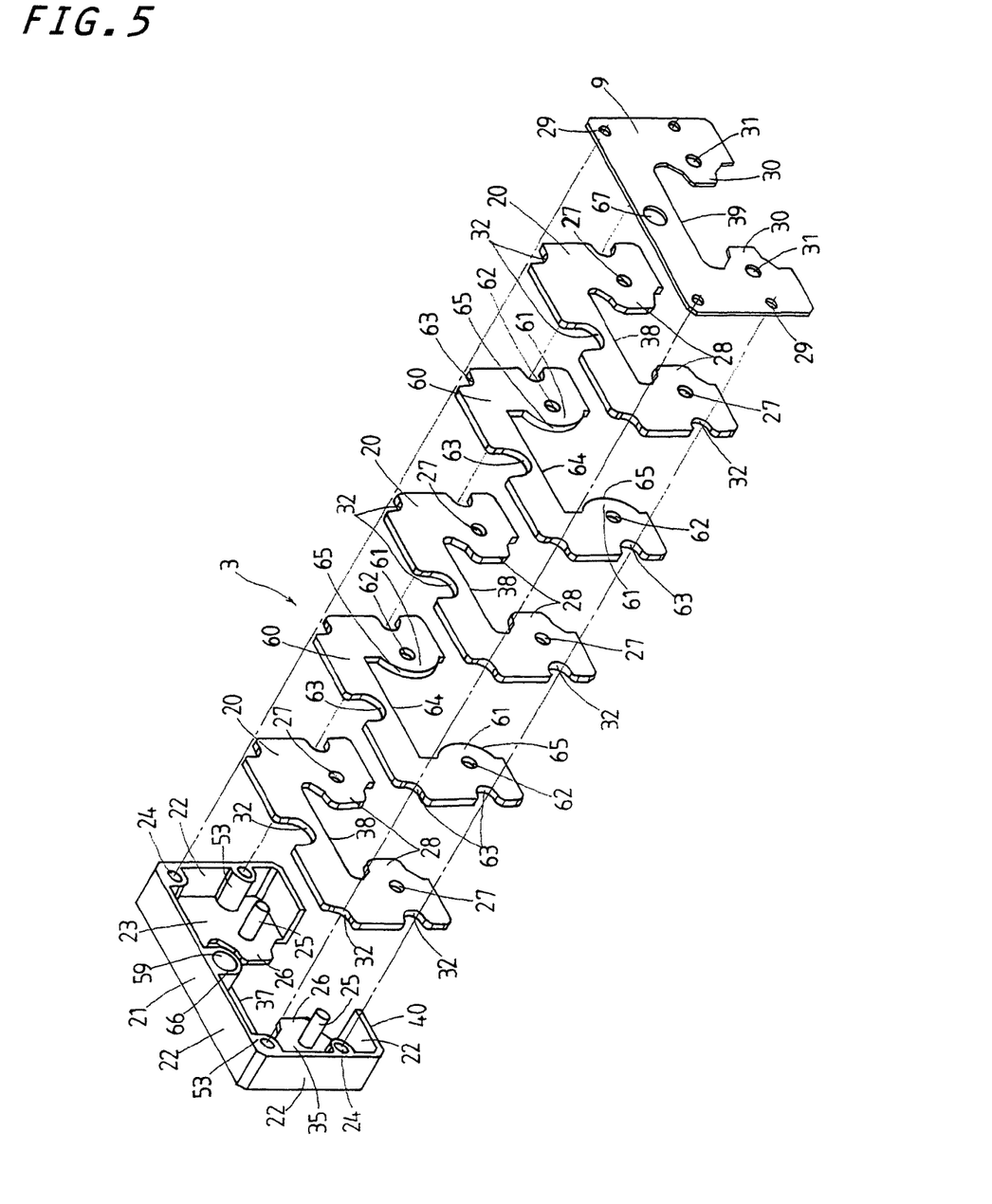
FIG. 5 is an exploded view in perspective of the highly-tight sealing unit to be incorporated into the linear motion guide system of FIG. 1.

The linear motion guide system according to the present invention will be described later with reference to the accompanying drawings showing a preferred embodiment of the present invention. The highly-tight sealing unit 3 of the present invention to be incorporated in the linear motion guide system, compared with the similar unit disclosed in the commonly assigned senior application, features that two sheets of lubrication plates 60 as shown in particular in FIG. 5 are each interposed between any two adjacent sealing plates 20. Referring now in detail to FIGS. 1 to 3, the linear motion guide of the present invention is mainly comprised of a guide rail 1 having raceway grooves 12 on lengthwise sides 14 thereof, and a slider 2 of inverted U-shape in transverse section, which fits over and conform to the guide rail 1. With the embodiment illustrated, the raceway grooves 12 on the guide rail 1 are so made as to provide races 13 befitting to using a roller as rolling element. With the linear motion guide system as stated earlier, the guide rail 1 is made on the raceways 12 thereof with race surfaces 13 to allow more than one roller, not shown, running on there, while the slider 2 is made thereon with raceway grooves, not shown, to provide race surfaces, not shown, lying in opposition to the race surfaces 13 of the guide rail 1. Between the race surfaces 13 on the guide rail 1 and the associated race surfaces on the slider 2, there are defined load races where the rollers run through there to allow the slider 2 to travel smoothly along the guide rail 1 in a sliding manner over a considerable long stroke.

The slider as shown in FIGS. 1 to 3 is in general comprised of a carriage 4 made thereon with raceway grooves to allow the rollers to run through there, end caps 5 secured to the forward and aft ends 46 of the carriage 4 and provided therein with turnaround passages to get the roller turning round in rolling direction, lubricating plates 6 secured on outward surfaces 47 of the end caps 5 to apply lubricant around the rollers, and end seals 7 attached on outward ends of the lubricating plates 6. Fastening screws 18 fit into widthwise opposite sides 50 of the carriage 4 to fasten retainers, not shown, to control the rollers. On a top surface 45 of the carriage 4, there are made threaded holes 17 that are used to make connection with any counterpart. Moreover, the end caps 5 have threaded holes 16 that are used to fit over a grease nipple 56, not shown, to feed the rollers with lubricant. Any threaded hole 16 with no grease nipple 56 is closed by a plug 57.

Figure 4:
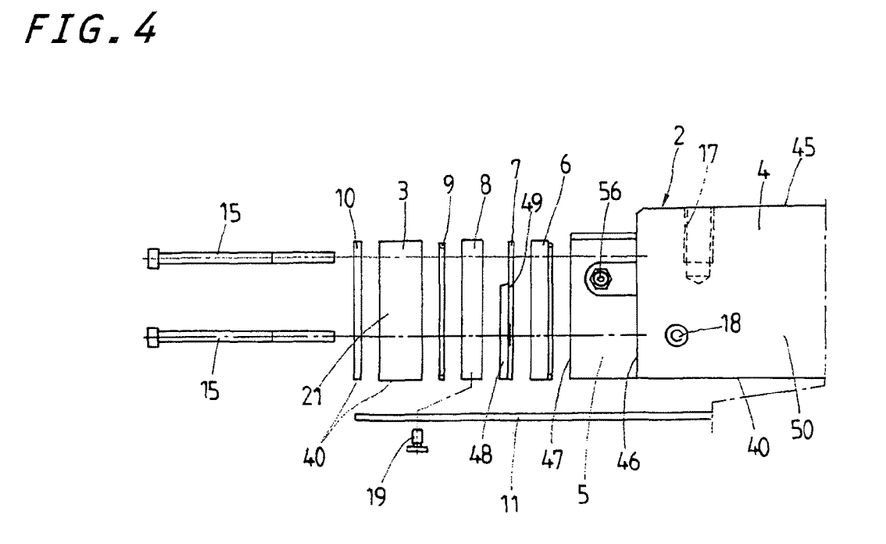
FIG. 4 is an exploded view of the highly-tight sealing unit installed on any one of forward and aft ends of the linear motion guide system of FIG. 1.

With the embodiment illustrated, the end seals 7 are closely fastened to the associated outward surfaces 47 of the end caps 5 in the norm of working atmosphere. Considering worse atmosphere or environment for the working condition than the norm, alternatively, the lubricating plates 6 for supplying lubricant around the rollers are preferably installed between the end caps 5 and the end seals 7 to make lubrication better as in the embodiment recited here. The lubricating plates 6, especially, are installed to come into sliding contact with at least the races 13 to apply the lubricant to the races 13. With the linear motion guide system of the present invention as shown in FIG. 4, moreover, highly-tight sealing units 3 are mounted on the outward surfaces of the end seals 7 through spacers 8, which are made of a metal formed in a cup to fit over lips 48 of the end seals 7. On the outward surfaces of the highly-tight sealing units 3, there are attached scraper plates 10 of metal sheet to keep any foreign matter such as sizeable debris and so on against entering inside the slider 2.

With the linear motion guide system of the present invention, moreover, lower seals 11 are provided to extend across the overall length of the underneath 40 of the slider 2 inclusive of the underneath 40 of the highly-tight sealing units 3 to closely seal the slider against the guide rail 1, making sure of high tightness of the slider 2 and the highly-tight sealing units 3 with respect to the guide rail 1. The lower seals 11 have lengthwise edges 55 that come into close engagement with the associated sides 14 of the guide rail 1, keeping the slider 2 and the highly-tight sealing units 3 well tight with respect to the guide rail 1. In the embodiment illustrated, the lower seals 11 are secured to the spacers 8 with fastening screws 19. The highly-tight sealing units 3 are mounted on the forward and aft ends of the slider 2 to keep the foreign matter including cutting chips, debris, dirt, coolants, processing fluids, and so on away from entering the slider 2 for a long-term service life, irrespective of the working in the worse atmosphere of air-borne matter including chips, dirt and dust, splashed coolants, and so on. The highly-tight sealing units 3 include therein many sealing plates 20 to achieve more complete sealing performance. With the embodiment recited here, moreover, scraper plates 10 are attached on the outward surfaces of the highly-tight sealing units 3. The scraper plates 10 each include a recess 51 adapted to fit over or conform to the guide rail 1 and sidewise opposite ridges 52 reaching the raceway grooves 12 of the guide rail 1.

The linear motion guide unit of the present invention, especially, features the construction of the highly-tight sealing units 3. The highly-tight sealing units 3 are mounted to the forward and aft ends of the slider 2 with fastening screws 15 to fit over the guide rail 1 so as to move together with the slider 2, and composed of a cassette 21 that holds therein both of more than one sealing plate 20 and more than one lubrication plate 60. The highly-tight sealing unit 3 is also distinctive by the shape and construction of the sealing plate 20 and the lubrication plate 60, the arrangement that the highly-tight sealing unit 3 is placed in front of the associated spacer 8, and the construction in itself of the highly-tight sealing unit 3. The highly-tight sealing unit 3 is in general comprised of the cassette 21 constructed with a front panel 23 and an enclosure 22, a plurality of, three in the illustrated version, sealing plates 20 and the lubrication plates 60 stowed inside the cassette 21 in a fashion that any one lubrication plate 60 is flanked by the sealing plates 20, and a rear panel 9 to come into mating or engagement with an open edge of the enclosure 22 to close cassette 21. The lubrication plates 60 are envisaged applying lubricant to both the sealing plates 20 and the races 13 of the guide rail 1.

With the linear motion guide unit of the present invention, the highly-tight sealing unit 3 of the version illustrated in detail features that the sealing plates 20 are made of a rigid type sheet material of mechanical froth urethane foams, one of which can be commercially available under the registered trademark "ZULEN". The sheet material of mechanical froth urethane foam is made in a three-layered structure and cut into the sealing plates 20 of desired shape. On the other side, the lubrication plates 60 lying between any two adjacent sealing plates 20 are made of cellular substance having open-celled structure including felts, thermally bonded fibers, sintered resins, open-celled foam products—for example usual urethane foam produced by generation or liberation of a gas—and the like. The lubrication plates 60 are each impregnated with lubricant. The sealing plates 20 are kept together with the lubrication plates 60 in a recessed space 35 inside the cassette 21 in a closely juxtaposed formation. In the embodiment illustrated, three of the sealing plates 20 are kept together with two of the lubrication plates 60 inside the cassette 21 in such formation that the sealing plates 20 are each flanked by the lubrication plates 60.

As shown in FIG. 5, the cassette 21 is composed of the enclosure 22 formed to provide a recessed space 35 surrounding around upper edges, bottom edges and widthwise opposing side edges of all the sealing plates 20 and the lubrication plates 60, and the front panel 23 attached to the enclosure 22 to close any one open end or outward end of the enclosure 22 with kept apart from the guide rail 1 with a clearance of not having to touch both the top surface 54 and sides 14 of the guide rail 1. The enclosure 22 is made in dimension to come into close engagement with the sealing plates 20 to exert any positive interference with the guide rail 1 to the sealing plates 20. The cassette 21 has four thickened bosses 53 where fastening holes 24 are made to allow fastening bolts 15 extending through there to clamp the cassette 21 to the outward end of the slider 2. Moreover, the enclosure 22 of the cassette 21 is thickened at the sidewise middle of an upper portion thereof to make a boss 66 to bore a lubrication port 59 through there. A grease nipple, not shown, fits into the lubrication port 59 to mainly supply lubricant into lubricating paths in the end caps 5. As an alternative, any other port can be made in the boss 66 to supply lubricant to the sealing plates 20 as well as the lubrication plates 60.

On the other side, both the sealing plates 20 and the lubrication plates 60 are cut away at 32 and 63 to allow the fastening bolts 15 and the boss 66 for the lubrication passing through there. The cassette 21 has sidewise opposing raised portions 26 reaching the associated raceway grooves 12 on the guide rail 1. At the raised portions 26, there are provided locating pins 25 to locate the sealing plates 20 in such a relation that they are kept in close engagement with both the top surface 54 and the sides 14 of the guide rail 1. The locating pins 25 further serve to keep the lubrication plates 60 in either contact condition with or non-contact condition away from the associated races 13 on the raceway grooves 12. Correspondingly, the sealing plates 20 and the lubrication plates 60 are all made with locating holes 27, 62 in conformity with the locating pins 25 of the cassette 21. Thus, it will be understood that the sealing function or interference of the sealing plates 20 with the guide rail 1 is to make the close engagement or contact of the raised portions 28 of the sealing plates 20 against the raceway grooves 12 on the guide rail 1. To this end, an interval between widthwise opposed raised portions 28 of the sealing plates 20 is made in dimension less than that between the raceway grooves 12 on the guide rail 1. The cassette 21 is left open in the other side thereof to stow the sealing plates 20 and the lubrication plates 60 into the recessed space 35 inside the cassette 21. After the installation of the sealing plates 20 together with the lubrication plates 60 in a closely stacked formation, the cassette 21 is closed with the closing panel 9.

The closing panel 9 serves to keep the sealing plates 20 flat with no warp on the outward surface of the spacer 8 attached on the end of the slider 2. With the highly-tight sealing unit 3 constructed as stated earlier, the cassette 21 is recessed at 37 in the front panel 23 while all the sealing plates 20, lubrication plates 60 and the closing panel 9, as with the front panel 23, are recessed at 38, 64 and 39, respectively to allow the highly-tight sealing unit 3 to fit or conform to the guide rail 1 to move together with the slider 2 along the guide rail 1 in a sliding manner. The closing plate 9 is made therein with holes 24 to allow the fastening bolts 15 extending through there, sidewise opposing raised portions 30 in conformity to but somewhat smaller than the raised portions 28 of the sealing plates 28, locating holes 31 to permit the locating pins 25 to extend through there, a recess 39 in conformity to the recess 37 in the front panel 23 of the cassette 21, and a lubricating port 67 in alignment with the lubricating port 59 in the cassette 21.

Figure 7:
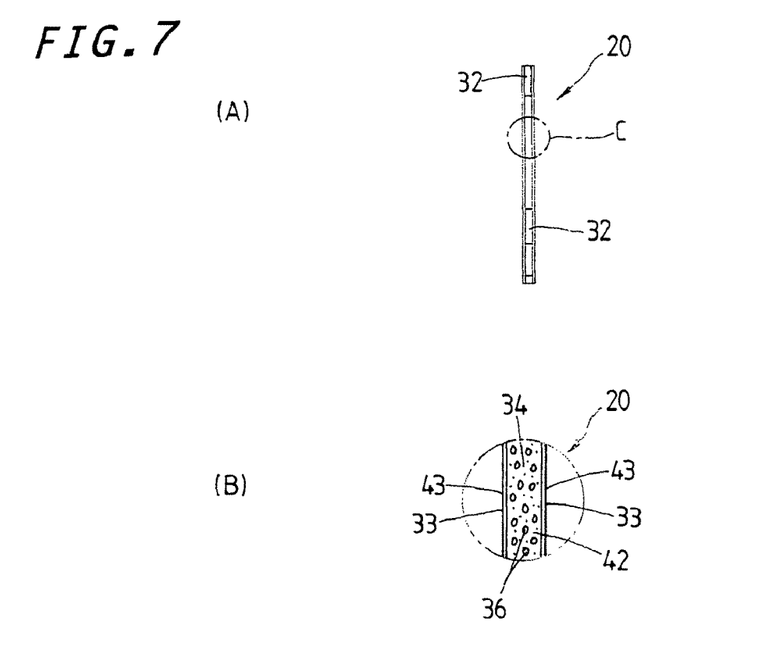
Figure 8:
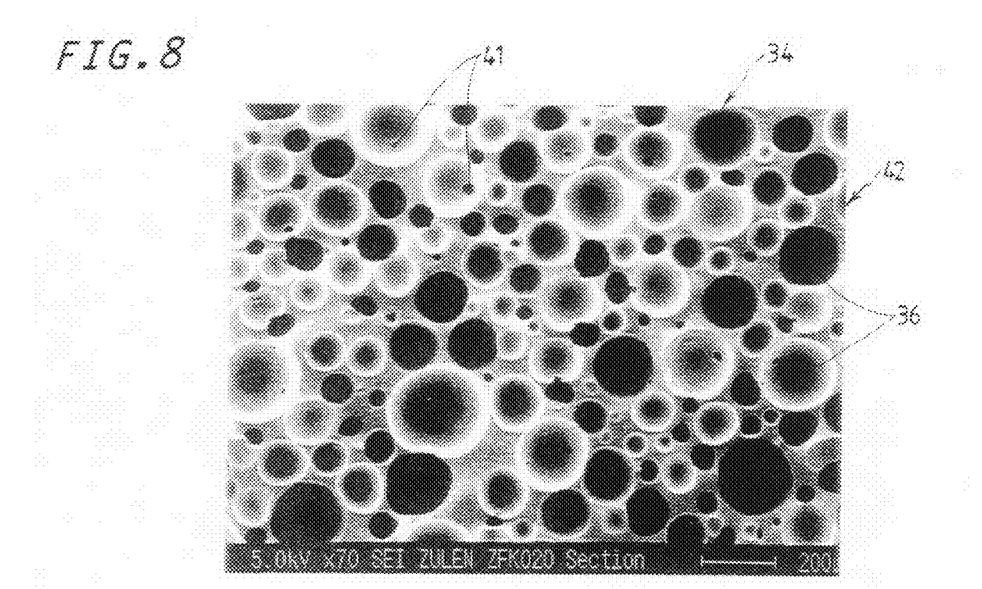
FIG. 8 is an enlarged photo-view in side elevation under microscope to visualize an intermediate medium of the sealing plate shown in FIG. 7(B)
Figure 9:
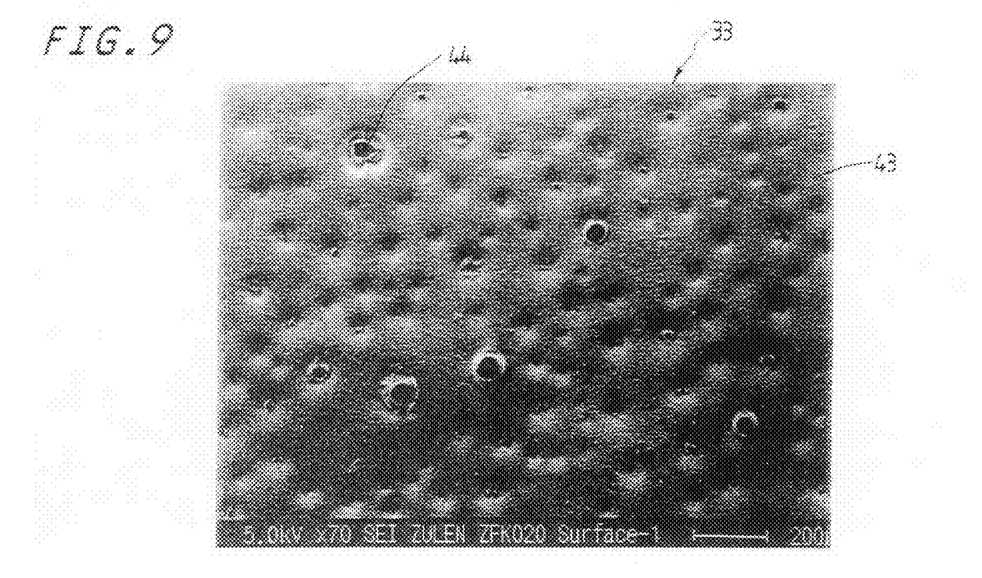
FIG. 9 is an enlarged photo-view in front elevation under microscope to visualize a skin layer of the sealing plate of FIG. 6.
Figure 10:
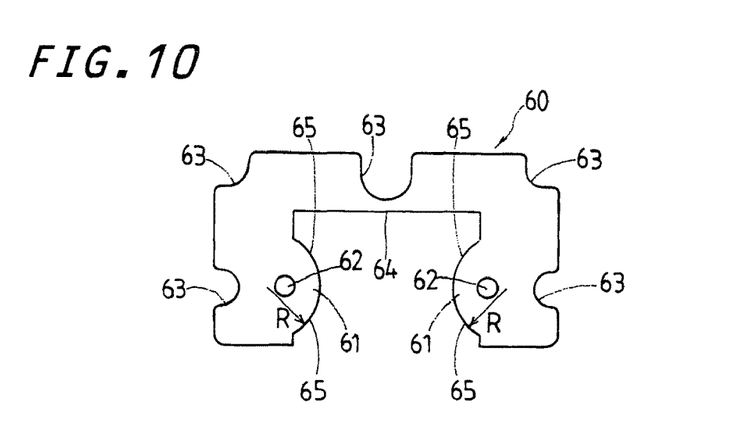
FIG. 10 is a view in front elevation of a lubrication plate to be incorporated in the high-tight sealing unit shown in FIG. 5.
Figure 11:
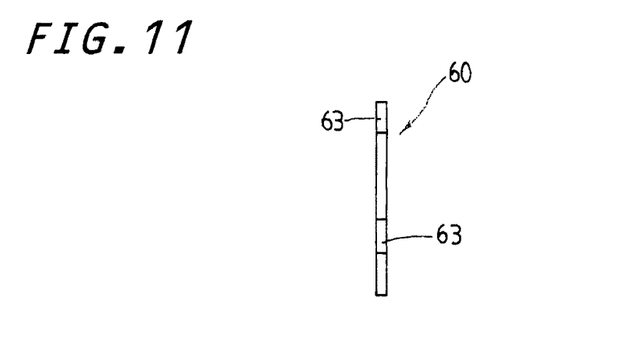
FIG. 11 is a view in side elevation of the lubrication plate of FIG. 10.
Figure 12:
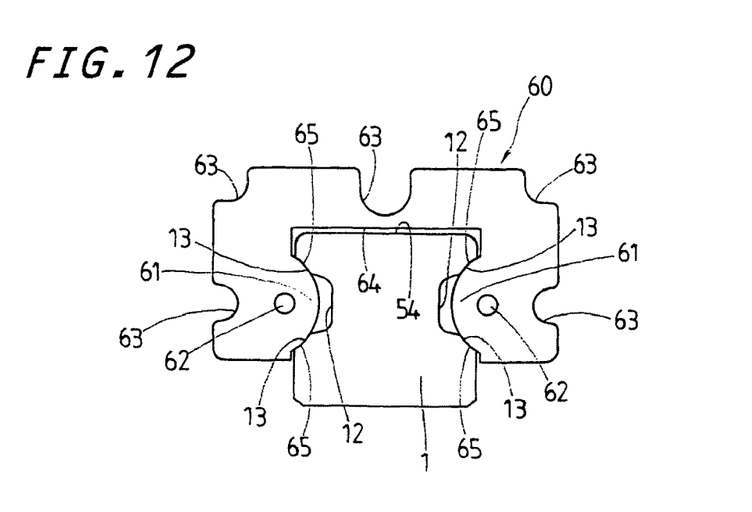
FIG. 12 is a view explanatory of mutual geometry of races on the guide rail of FIG. 2 with the lubrication plate of FIG. 10, which fits over the guide rail.

The sealing plates 20 in the version explained here had a thickness of 2.0 mm and were produced of mechanical froth urethane foam selected out of many mechanical froth urethane foams different in mechanical properties, which are on sale with the registered trademark "ZULEN". The selected mechanical froth urethane foam had mechanical properties of density of 0.45 g/cm$^3$, ASKER C hardness of 67, elongation percent of 160%, tensile strength of 31.8 kg/cm$^2$, tear strength 8.3 kg/cm, repulsion elasticity of 30% and compressive residual strain of 5.9%. Testing results for a variety of materials different in their properties proved that the mechanical froth urethane foam of the mechanical properties as recited earlier was preferable or better for the sealing plates 20. The mechanical froth urethane foams have been generally used as impact absorbers and sealing members including packing and so on. Of the mechanical froth urethane foams of "ZULEN" different in structure, it was found that the rigid type of those was most preferred for the sealing plates 20 in working performance. In particular, the sealing plate 20 desired for making the frictional resistance of the slider 2 less had mechanical properties of density of 0.45 g/cm$^3$, ASKER C hardness of 53, elongation percent of 165%, tensile strength of 20.4 kg/cm$^2$, tear strength 6.2 kg/cm, repulsion elasticity of 35% and compressive residual strain of 5.1%. As an alternative, the sealing plate 20 desired for less frictional resistance of the slider 2 had mechanical properties of density of 0.3 g/cm$^3$, ASKER C hardness of 38, elongation percent of 160%, tensile strength of 12.7 kg/cm$^2$, tear strength 3.7 kg/cm, repulsion elasticity of 35% and compressive residual strain of 5.3%. Moreover, the highly-tight 3 may be built with only two of the sealing plates 20 and a single sheet of the lubrication plate 60. Unlike the conventional urethane foams, the sealing plates 20 as shown in FIGS. 7 to 9 are made in such structure that their surfaces or skins 33 come into an epidermal layer 43 of close-grained rubbery texture in which most cells or pores are clogged or closed with some pores remaining opened to leave sporadic openings 44 in places, while an intermediate medium 34 is composed of a spongy layer 42. The epidermal layer 43 of rubbery texture is made in a thin film of a matter of some μm. The spongy layer 42 as shown in FIG. 8 has such structure that most cells or pores 36 are walled off from each other and intercommunicated with one another at only parts 41 where the adjacent cells 36 come into contact with each other, forming open-pores or open-cells.

Figure 6:
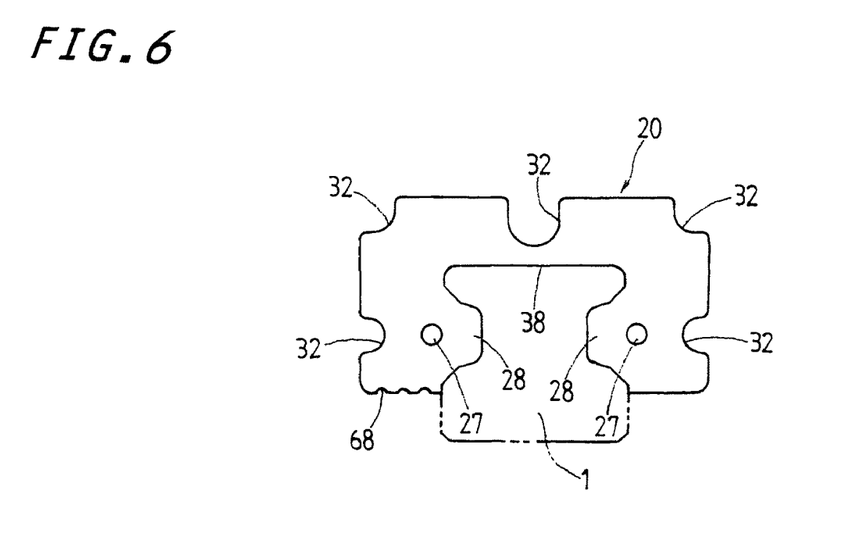
FIG. 6 is a view in front elevation of a sealing plate used in the highly-tight sealing unit of FIG. 5.

With the embodiment constructed as stated earlier, the sealing plate 20 is made in a fashion hardly impregnated with lubricating oil or liquids even when bathed intact in them. To fill the sealing plate 20 with the lubricating oil, the sealing plate 20 is first squeezed to collapse, and then released from the squeezed condition after having immersed in the lubricating oil to restore the sealing plate 20 to its original state, thereby getting the pores or cells 36 in the spongy layer 42 forcibly absorbing the lubricating oil to finish the sealing plate 20. As this occurred, the impregnated amount of lubricating oil was a matter of 10~15%. As shown in FIG. 9, the openings 44 caused by bursts of some foams are found sporadically in places in the epidermal layer 43. The skin 33 of the sealing plate 20 is clogged to provide the epidermal layer 43 of rubbery texture, which is an extremely thin film with no foam or bubble. Thus, it is considered that the grain or texture of the epidermal layer 43 forms at mutual contact between the material for the mechanical froth urethane foams and the mold surface in the course of production of the mechanical froth urethane foams. The sealing plates 20 for the highly-tight sealing unit 3 are made by cutting the sheet material of mechanical froth urethane foam into the desired shape as shown in FIG. 6. With the sealing plates 20 produced as stated earlier, the spongy layer 42 interposed between the epidermal layers 43 as shown in FIG. 7 is visually exposed at the overall cut edge around the sealing plate 20 inclusive of the outward and inward peripheries. Moreover, the sealing plate 20 has signs 68 thereon to help easily tell one side from the other, which is different in roughness of texture from the former.

The lubrication plate 60 can be made of a lubricant-containing member, which is made from fine particles of synthetic polymer blended or mixed with lubricant. The admixture of fine particles of synthetic polymer and lubricant, after molten by heating, is poured into a mold cavity, where it solidifies to form the lubricant-containing member. The lubrication plate 60 comes into engagement with the associated raceway 13 on the guide rail 1 to apply lubricant or lubricating fluid to the sealing plates 20 to reduce the frictional resistance that is encountered when the sealing plates 20 slide over the guide rail 1, lessening wear of the sealing plates 20 to make the sealing plates 20 more sustainable for long-term service. The lubrication plate 60 further serves to supply increased amount of lubricant to the raceways 13 of the guide rail 1, preventing lubrication failure. There is no potential problem about whether the lubrication plates 60 have to touch or not to touch at their inward sliding-contact edges 65 of the raised portions 61 with the outside contour around the guide rail 1. Even if the sliding-contact edges 65 of the raised portions 60 are kept away from touching the races 13, the lubricant oozing out from the lubrication plate 60 is allowed to flow over an epidermal layer 43 of the sealing plate 20, reaching a boundary where the sealing plates 20 and the guide rail 1 slide or trend to slide over each other.

With the lubrication plates 60 constructed as stated earlier, moreover, when the sliding-contact edges 65 of the raised portions 60 are kept away from touching the races 13, there remains a clearance between the outside contour of the guide rail 1 and the inward edges of the lubrication plates 60 to keep there fine foreign matter that might escape from the sealing plates 20. In contrast, the lubrication plates 60 can be also placed to touch the races 13 either throughout their sliding-contact edges 65 or partially. When less frictional resistance is preferred, it is recommended to place the lubrication plates 60 in a fashion their sliding-contact edges 65 come into partial engagement with the races 13. On the other side, the lubrication plate 60 placed to come into the guide rail 1 throughout their entire sliding-contact edges 65 may serve dustproof functions enough for even tougher working atmosphere. With the version the lubrication plates 60 come into the guide rail 1 throughout their entire sliding-contact edges 65 as stated earlier, no interference is sufficient.

The lubrication plate 60 in the embodiment discussed here, as shown in FIGS. 5 and 10 to 12, has the raised portions 61 whose rounded sliding-contact edges 65 come partially into engagement with their associated races 13 of the guide rail 1 to apply the lubricant to the sealing plates 20, preventing rupture of lubricant film on the races 13. In the embodiment illustrated, the lubrication plates 60 are made of felts. Fibers possessing felting properties are better in functions of clinching to minute foreign matter that has survived the sealing plates 20. The lubrication plates 60 are expected to serve many functions of not only positive application of lubricant, but also absorption/preservation of lubricant, protection against minute foreign matter surviving the sealing plates 20 as well as absorption/preservation of coolants, cutting fluids and so on escaping through the sealing plates 20. The lubrication plates 60 are made distinctive in their functional properties, depending on their fibrous materials. Thus, fibrous materials for the lubrication plates 60 can be properly selected in conformity with the working environment where the linear motion guide system operates.

Figure 13:
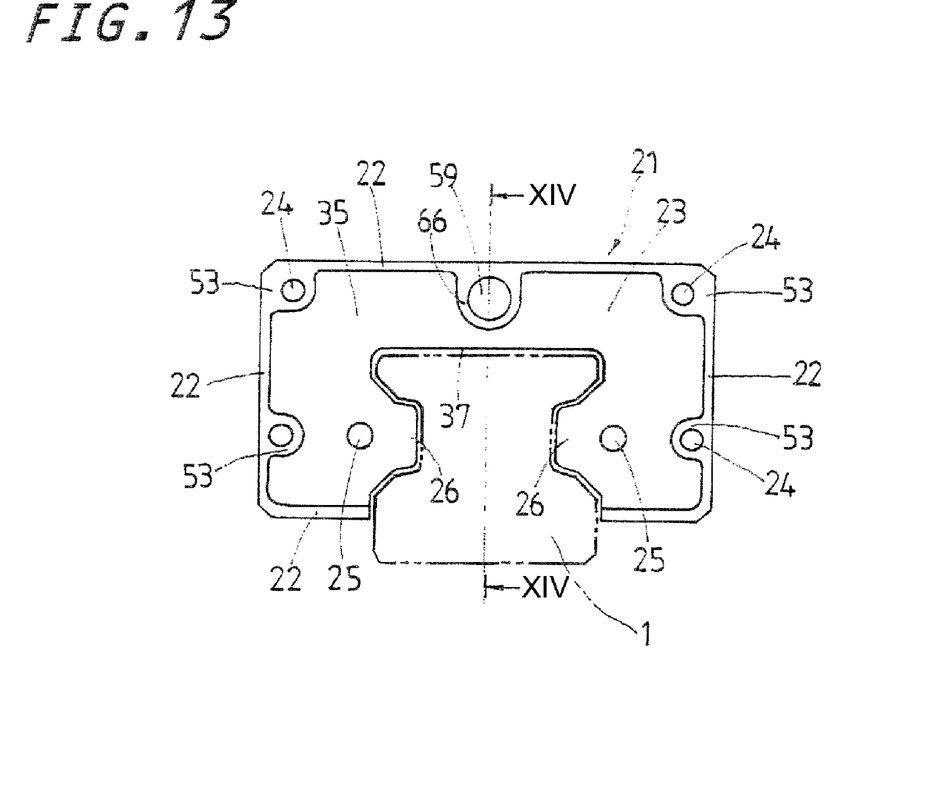
FIG. 13 is a view in rear elevation of a cassette used in the highly-tight sealing unit of FIG. 5.
Figure 14:
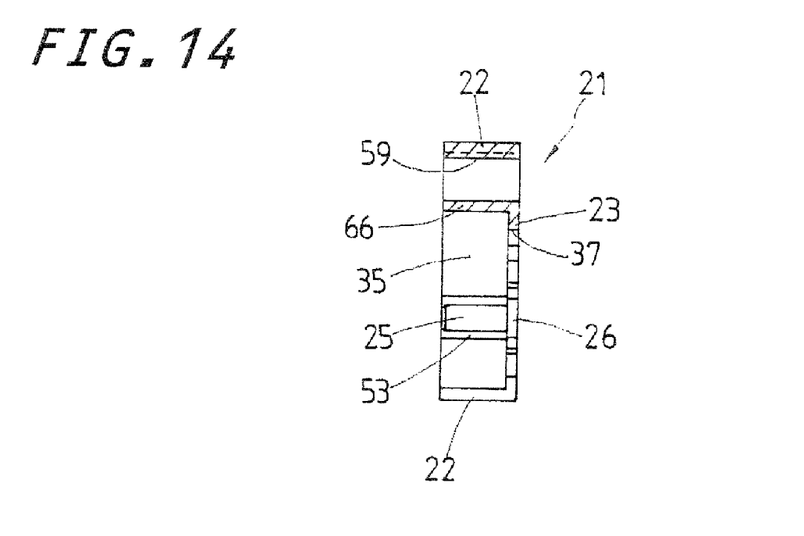
FIG. 14 is a view in transverse section of the cassette, the view being taken on a plane lying on the line XIV-XIV of FIG. 13.

With the highly-tight sealing unit 3 of the present invention, as shown in FIGS. 5, 13 and 14, the cassette 21 is made therein with the lubricating port 59 adapted to the connection with the grease nipple and so on to make it possible to feed the slider with lubricant at the widthwise middle of any one of the forward and aft ends of the slider 2. In the embodiment illustrated in FIGS. 1 and 2, the forward and aft end caps 5 is communicated at their sides with the grease nipple 56, while the lubricating hole 59 in the other end cap 5 is closed with the plug 57 instead of the grease nipple as seen in FIG. 1. Moreover, the scraper plates 10 are secured on their associated cassettes 21. Thus, the highly-tight sealing unit 3 mounted on the end cap 5 whose lubricating hole is closed with the plug would be farther away from the lubricant applicator site. If another lubricant applicator site is further required for the highly-tight sealing unit 3 distant from the existing lubricant applicator site, the scraper plate 10 is cut away to form an opening in conformity with the lubricating port 59 of the cassette 21 to allow the grease nipple to fit into the lubricating port 59 of the cassette 21. The scraper plate 10 is made of a thin steel sheet and, as shown in FIGS. 1 to 4, is secured on the outermost end of the slider 2 to keep the foreign matter comparatively large in size including cutting chips and the like against entering inside the slider 2. The scraper plate 10 is recessed to fit over or conform to the guide rail 1 in a way that the inward edges of the scraper plate 10 around the guide rail 1 are kept from touching the guide rail 1 with a minute clearance. In like manner, both the front panel and the closing panel 9 of the cassette 21 are recessed to fit over or conform to the guide rail 1 in a fashion that the inward edges thereof around the guide rail 1 are kept from touching the guide rail 1 with a minute clearance.

With the linear motion guide system of the present invention, all the sealing plates 20 impregnated with lubricant and the lubrication plates 60 have the constructional features as follows. The end seals 7 shown in FIGS. 1, 2 and 4 are envisaged getting secured more easily to the forward and aft ends of the slider 2, and made of the conventional rubber seal in which a metal core 49 is baked thereon with the rubber lip 48. In contrast, the sealing plates 20 and the lubrication plates 60 built in the highly-tight sealing unit 3 in the linear motion guide unit of the present invention, because of rich in elasticity or flexibility to be subject to deflection, has to be stowed or accommodated into the cassette 21 to make sure of the shape retention thereof, keeping the tightness better for a long-lasting service life. The highly-tight sealing unit 3 in which the sealing plates 20 are combined with the lubrication plates 60 features as follows.

First, As contrasted with the sealing plate 20 of the present invention, the end seal 7 of conventional rubber-made seal with lips 48, when designed to make the interference of the seal with the guide rail 1 more, for example a matter of 0.5 mm, to achieve the highly-tight sealing performance, would strongly wipe the lubricant off the guide rail 1, causing lubrication failure that would lead to much wear of the extremities of the lips 48 coming into sliding contact with the guide rail 1. As a result, the greater the frictional resistance that is encountered when the end seal 7 slides over the guide rail 1, the worse the sealing effect that the end seal 7 works on the guide rail 1. On the contrary to the end seal 7 as recited above, with the sealing plates 20 and the lubrication plates 60 impregnated with the lubricant, the severe squeezing pressure exerted on the sealing plate 20 owing to much interference can be alleviated by combined function of the spongy 43 of the intermediate medium 34 of the sealing plates 20 with the lubrication plates 60. Moreover, lubricating performance of the lubrication plates 60 as well as self-lubrication with lubricant impregnated in the sealing plates 20 may be automatic to provide steady and positive application to the guide rail 1, thereby avoiding the lubrication failure. The skin 33 or epidermal layer 43 of close-grained rubbery texture is better to get rid of foreign matter such as dust, debris, and liquid contaminant including coolants, processing liquids, lubricating oils and so on, which might adhere to the guide rail 1. The epidermal layer 43 in the sealing plate 20 is further better in wear proof and durability.

Second, the sealing plate 20, unlike the materials such as felts, urethane foams and the like, has cells 36 that are dense, fine and uniform in size, but most of which are independently of each other. The cells 36 are filled with sufficient lubricant and therefore cannot absorb liquids such as coolants and the like any further. Since there is less possibility that the lubricant solidifies, the sealing plate 20 may serve functions of sealing and lubrication for a long-term service period. The lubricant content in the sealing plate 20 is about 10~15 volume % that is less than the lubricant content in the conventional felts, urethane foams, but more compared with the lubricant content (about 5 volume %) of the conventional rubber seals containing lubricants in their material. Thus, the sealing plate 20 is considered to be rich in self-lubricating performance.

Third, with the sealing plate 20 of the present invention, the skin 33 is made in the epidermal layer 43 of extremely thin and rubbery texture, which can be bent or deformed to well conform to any complicated contour with experiencing no hardening and no fatigue.

Fourth, the sealing plate 20 is superior in oil proof, resistance to chemicals and wear proof, making sure of high sustainability and long-lasting service life.

What is claimed is:

1. A linear motion guide system, comprising a guide rail made with a lengthwise raceway groove, a slider moving on the guide rail in a sliding manner by virtue of more than one roller, and a highly-tight sealing unit mounted on any one of forward and aft ends of the slider to come into close sliding-contact with lengthwise outward surfaces around the guide rail, making sure of highly sealing effect to keep any foreign matter away from entering inside the slider;

wherein the highly-tight sealing unit is comprised of a cassette constituted by a front panel and an enclosure with the front panel at any one of edges thereof, sealing plates stowed in the cassette, at least one lubrication plate lying in close adjacency to the sealing plates to supply the sealing plates with lubricant; and a rear panel to close an open edge of the enclosure, the cassette having a locating pin planted on and protruding from the front panel thereof, wherein the sealing plates and the at least one lubrication plate are each made with a locating hole to fit over the locating pin on the front panel, wherein the sealing plates are each composed of a sheet of mechanical froth urethane foam of low foam ratio, which is formed by frothing mechanically a raw liquid mixed with air, the sheet having a three-layered structure composed of skin layers of rubbery texture to constitute epidermal layers and an intermediate medium of spongy texture lying between the epidermal layers, and the spongy texture medium being impregnated with lubricant, and wherein the lubrication plates have a sliding-contact edge that is allowed to come into a race formed on the guide rail, for applying the lubricant to the race on the guide rail.

2. A linear motion guide system constructed as defined in claim 1, wherein the lubrication plates are made of any material selected from felts, thermally bonded fibers, sintered resins, and open-celled foam products, which are impregnated with lubricant.

3. A linear motion guide system constructed as defined in claim 1, wherein the slider is comprised of a carriage made thereon with a race to allow more than one roller to run through the race, an end cap secured to any one of forward and aft ends of the carriage and provided therein with a turn-around passage to get the roller turning round in rolling direction, a lubricating plate secured on an outward surface of the end cap to apply lubricant around the roller, and an end seal attached on an outward end of the lubricating plate, and wherein the highly-tight sealing unit is further mounted on an outward surface of the end seal through a spacer.

* * * * *